(12) United States Patent
Carvalho

(10) Patent No.: US 8,955,409 B2
(45) Date of Patent: Feb. 17, 2015

(54) ROTATING ASSEMBLY INCLUDING A DYNAMIC BALANCING SYSTEM

(71) Applicant: Paul A. Carvalho, Hadley, MA (US)

(72) Inventor: Paul A. Carvalho, Hadley, MA (US)

(73) Assignee: Hamilton Sundstrand Corporation, Winsdor Locks, CT (US)

( * ) Notice: Subject to any disclaimer, the term of this patent is extended or adjusted under 35 U.S.C. 154(b) by 133 days.

(21) Appl. No.: 13/650,298

(22) Filed: Oct. 12, 2012

(65) Prior Publication Data
US 2014/0102246 A1    Apr. 17, 2014

(51) Int. Cl.
*F16F 15/14*    (2006.01)
*G01M 3/08*    (2006.01)
*B64C 11/00*    (2006.01)

(52) U.S. Cl.
USPC ............... 74/574.2; 700/280; 416/145

(58) Field of Classification Search
CPC ........ F16F 15/286; F16F 15/32; F01D 5/027; B64C 27/001; B64C 2027/003
USPC ............ 74/570.2, 571.1, 572.2, 572.4, 574.1, 74/574.2, 574.4; 416/144, 145, 500; 464/180; 700/95, 170, 192, 279, 280; 701/124; 73/462, 468, 470
IPC ........................................................ F16F 15/22
See application file for complete search history.

(56) References Cited

U.S. PATENT DOCUMENTS

| | | | |
|---|---|---|---|
| 2,186,199 A * | 1/1940 | Martin | 416/145 |
| 2,236,139 A * | 3/1941 | Hutchison, Jr. | 416/43 |
| 3,508,843 A | 4/1970 | Schmidt | |
| 3,830,109 A * | 8/1974 | Litvinovich et al. | 73/455 |
| 3,999,888 A | 12/1976 | Zincone | |
| 4,879,792 A | 11/1989 | O'Connor | |
| 4,913,623 A | 4/1990 | Schilling et al. | |
| 5,304,038 A | 4/1994 | MacMurray | |
| 5,676,025 A * | 10/1997 | Lulay | 74/570.2 |
| 5,688,160 A | 11/1997 | Pozzetti et al. | |
| 6,062,818 A * | 5/2000 | Manfredotti et al. | 416/145 |
| 6,236,934 B1 | 5/2001 | Dyer et al. | |
| 6,494,680 B2 * | 12/2002 | Cardin | 416/145 |

(Continued)

FOREIGN PATENT DOCUMENTS

CN    102927197 A    2/2013

OTHER PUBLICATIONS

GB Search Report for GB Application No. 1317931.2, dated Apr. 25, 2014, pp. 1-3.

*Primary Examiner* — Thomas R. Hannon
*Assistant Examiner* — Adam D Rogers
(74) *Attorney, Agent, or Firm* — Cantor Colburn LLP

(57) ABSTRACT

A rotating assembly includes a shaft having a driven end and a driving end. At least one rotating member coupled to the driven end. A support member is operatively connected to the at least one rotating member. A dynamic balancing system is operatively coupled to the support member. The dynamic balancing system includes a first balancing weight rotatably mounted to the support member. The first balancing weight is operatively connected to a first motor. A second balancing weight is rotatably mounted to the support member. The second balancing weight is operatively connected to a second motor. A controller is operatively connected to the first and second motors. The controller is configured and disposed to signal each of the first and second motors to rotate and to establish a desired position of the first balancing weight and the second balancing weight relative to at least one rotating member.

21 Claims, 4 Drawing Sheets

(56) References Cited

U.S. PATENT DOCUMENTS

| | | |
|---|---|---|
| 6,618,646 B1 | 9/2003 | Dyer |
| 6,883,373 B2 | 4/2005 | Dyer |
| 7,587,929 B2 | 9/2009 | Zielinski et al. |
| 8,021,115 B2 * | 9/2011 | Welsh ........................... 416/145 |
| 8,100,009 B2 | 1/2012 | Dyer |
| 8,172,511 B2 | 5/2012 | Duong et al. |
| 2006/0083617 A1 | 4/2006 | Jolly et al. |
| 2010/0065347 A1 * | 3/2010 | Kereth ......................... 180/9.42 |

* cited by examiner

US 8,955,409 B2

ROTATING ASSEMBLY INCLUDING A DYNAMIC BALANCING SYSTEM

BACKGROUND OF THE INVENTION

Exemplary embodiments pertain to rotating assemblies and, more particularly, to a rotating assembly including a dynamic balancing system.

Components that rotate about an axis are or can become out of balance. An out of balance condition for a rotating component generates vibrations. The magnitude of the vibrations generally increases as rotational speed of the component increases. Many systems are negatively affected by vibrations. Hence, there exist a number of component balancing systems that mitigate an out of balance condition to lessen any vibrational response. In some systems, such as in automobiles, a weight is mounted to the rotating component (e.g., tire and rim assembly) to counter-act an out of balance condition. Such arrangements typically counter-act an out of balance condition for a fixed geometry. Some systems that rotate, such as variable pitch propellers, have a variable geometry that can change the balance condition during operation and therefor generally cannot be accommodated by fixed balance weight placement.

BRIEF DESCRIPTION OF THE INVENTION

Disclosed is a rotating assembly including a shaft having a driven end and a driving end. At least one rotating member is coupled to the driven end. A support member is operatively connected to the at least one rotating member. A dynamic balancing system is operatively coupled to the support member. The dynamic balancing system includes a first balancing weight rotatably mounted to the support member. The first balancing weight is operatively connected to a first motor. A second balancing weight is rotatably mounted to the support member. The second balancing weight is operatively connected to a second motor. A controller is operatively connected to the first and second motors. The controller is configured and disposed to signal each of the first and second motors to rotate and to establish a desired position of the first balancing weight and the second balancing weight relative to the at least one rotating member to reduce system vibration.

Also disclosed is a method of balancing a rotating assembly including at least one rotating member. The method includes imparting a driving force to a shaft operatively coupled to the at least one rotating member, rotating a first balancing weight operatively coupled to a second support member arranged axially outboard of, and connected with, the first and second rotating members, rotating a second balancing weight operatively coupled to the second support member, and controlling a position of the first balancing weight and the second balancing weight relative to the at least one rotating member to reduce system vibration.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
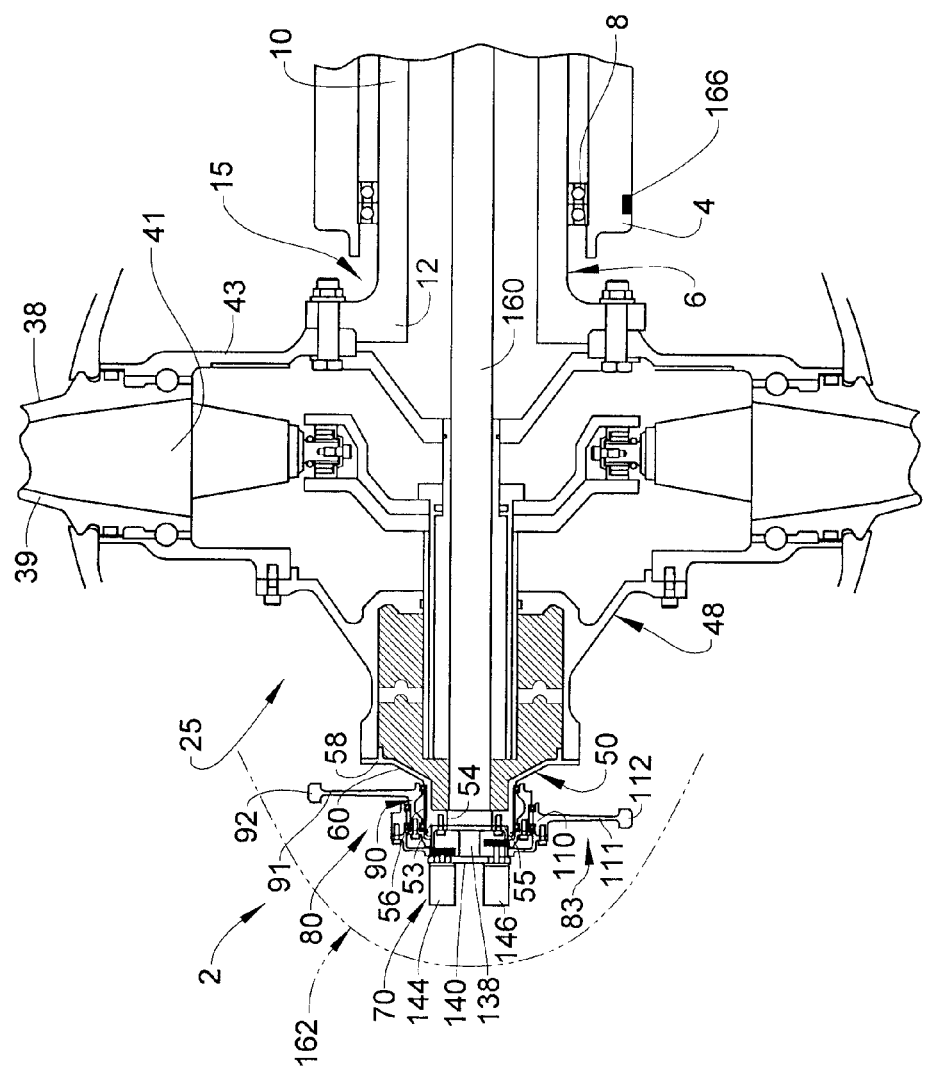
FIG. 1 is a partial, cross-sectional view of an aircraft propeller system including a dynamic balancing system in accordance with an exemplary embodiment.

A propeller system in accordance with an exemplary embodiment is indicated at 2 in FIG. 1. Propeller system 2 is supported by an airframe 4 and includes a central shaft 6. Shaft 6 is supported to airframe 4 through a plurality of bearings, one of which is indicated at 8. Shaft 6 includes a driven end 10 coupled to an engine (not shown) and a driving end 12. Driving end 12 includes a mounting flange 15 that supports a rotating assembly 25.

Figure 2:
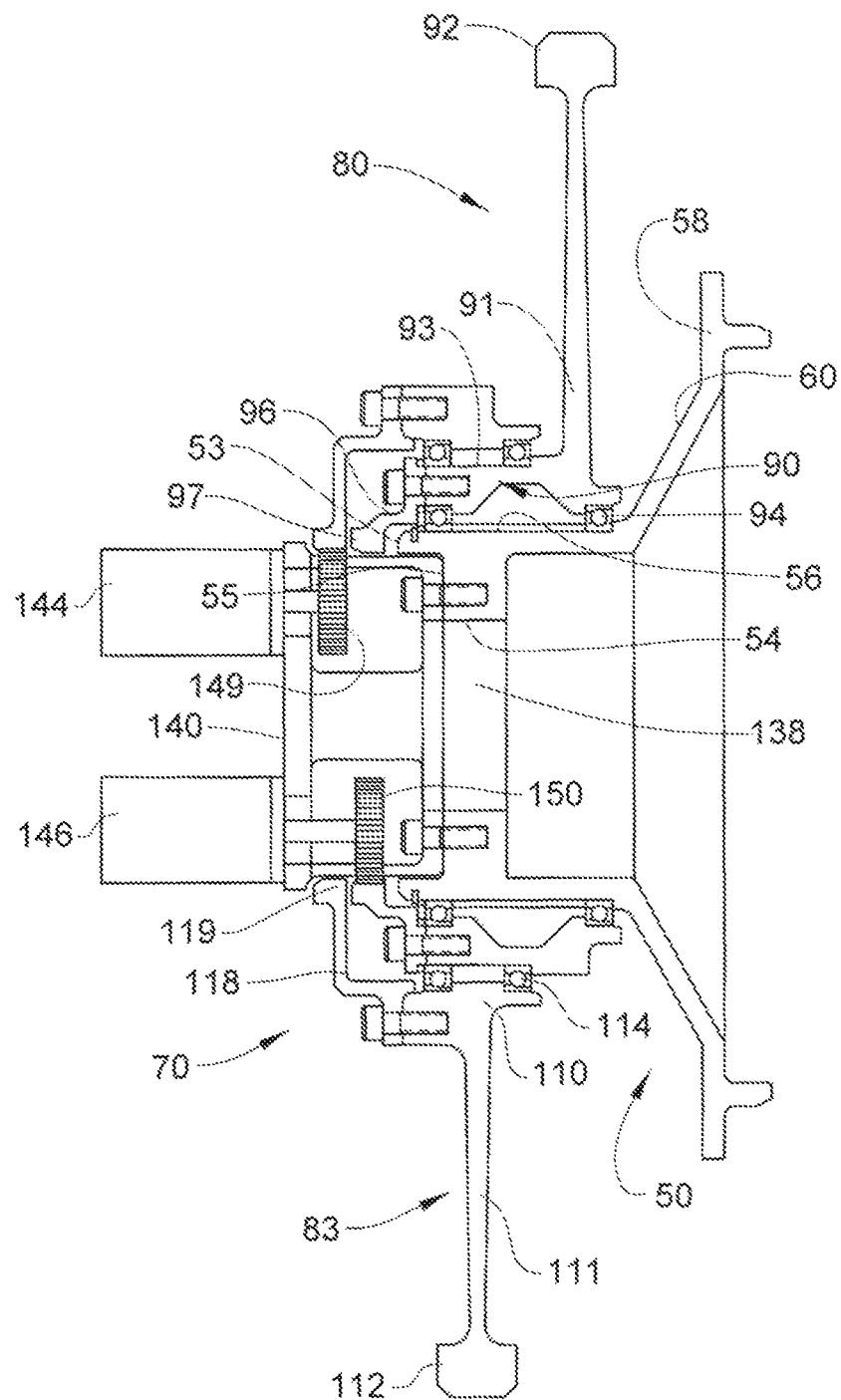
FIG. 2 is a side plan view of the dynamic balancing system of FIG. 1.

Rotating assembly 25 includes a plurality or rotating members, one of which is indicated at 38. Rotating member 38 is shown in the form of a propeller 39 having a first or root end 41 that extends to a tip end (not shown). First end 41 is mounted in a hub 43. Hub 43 is operatively connected to mounting flange 15 on shaft 6. Hub 43 is coupled to an actuator 48. Actuator 48 is coupled to a support member 50. First end 41 also includes a pitch control section (not separately labeled) that is connected to a pitch control mechanism (also not separately labeled). As best shown in FIG. 2, support member 50 includes a first end portion 53 having a central opening 54 and a mounting surface 55. First end portion 53 also includes an annular side wall 56 that extends to an outer edge 58 through an angled surface 60. As will be discussed more fully below, support member 50 supports a dynamic balancing system 70 that is co-located with rotating members 38.

In accordance with an exemplary embodiment, dynamic balancing system 70 includes a first balancing weight member 80 and a second balancing weight member 83. First balancing weight member 80 includes a first base portion 90 and a first cantilevered arm portion 91. First cantilevered arm portion 91 extends from first base portion 90 and supports a first balancing weight 92. First base portion 90 also includes an outer race 93 that supports second balancing weight member 83. First base portion 90 is rotatably mounted to annular side wall 56 of support member 50 through a pair of bearings, one of which is indicated at 94. A first driving member 96 is coupled to first base portion 90. First driving member 96 supports a first ring gear 97 that receives a driving force to rotate first balancing weight member 80 as will be detailed more fully below.

Second balancing weight member 83 includes a second base portion 110 and a second cantilevered arm portion 111. Second cantilevered arm portion 111 extends from second base portion 110 and supports a second balancing weight 112. Second base portion 110 is rotatably mounted to outer race 93 provided on first base portion 90 through a pair of bearings, one of which is indicated at 114. A second driving member 118 is coupled to second base portion 110. Second driving member 118 supports a second ring gear 119 that receives a driving force to rotate second balancing weight member 83 as will be detailed more fully below.

In further accordance with an exemplary embodiment, dynamic balancing system 70 includes a motor support 138 coupled to mounting surface 55 provided on support member 50. Motor support 138 includes a motor mounting surface 140 that supports a first motor 144 and a second motor 146. First motor 144 includes a first drive gear 149 that is operatively coupled to first ring gear 97. Second motor 146 includes a second drive gear 150 that is operatively coupled to second ring gear 119. First and second motors 144 and 146 are connected to an electrical source through electrical conducts (not shown) carried by a conduit 160 (shown in FIG. 1). Electrical energy may be passed from airframe 4 to conduit 160, which rotates with shaft 6, through a variety of known techniques for passing energy between rotating and non-rotating components. First and second motors 144 and 146 rotate first and second balancing weight members 80 and 83 to counteract vibrations produced by an out-of-balance condition in rotating members 38, shaft 6 or the like. First and second motors 144 and 146 also establish a desired position of the first balancing weight 92 relative to the second balancing weight 112 as will be detailed more fully below. Dynamic balancing system 70 as well as portions of rotating members 38 are covered by a protective hub member 162 (shown in FIG. 1).

Figure 3:
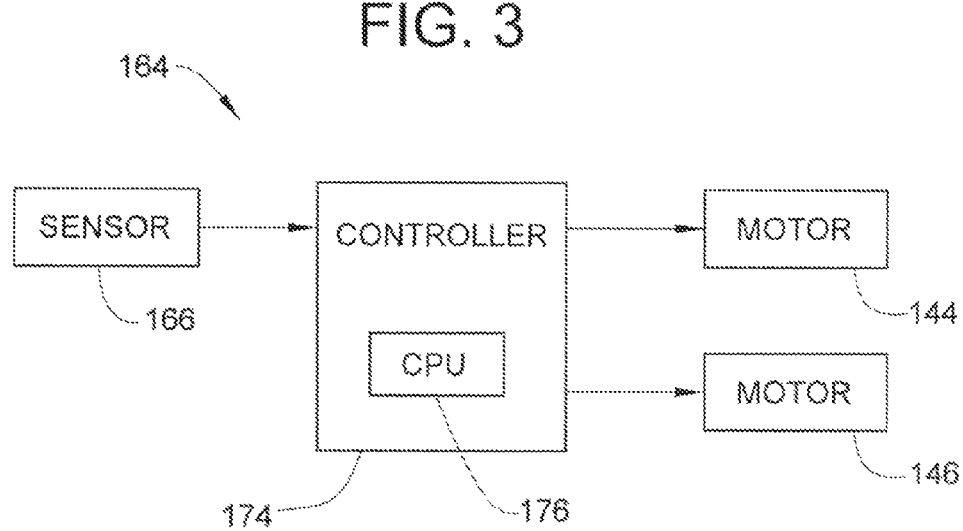
FIG. 3 is a schematic view of a control system of the dynamic balancing system of FIG. 1.
Figure 4:
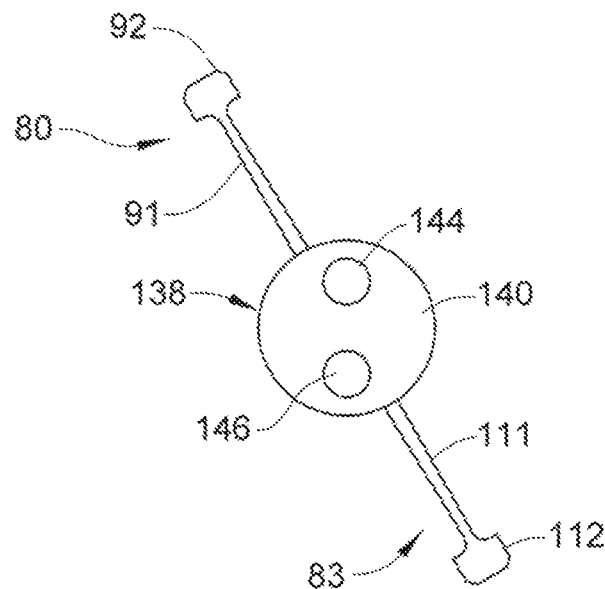
FIG. 4 is an axial plan view of the dynamic balancing system of FIG. 2 illustrating first and second balancing weights in a first configuration.
Figure 5:
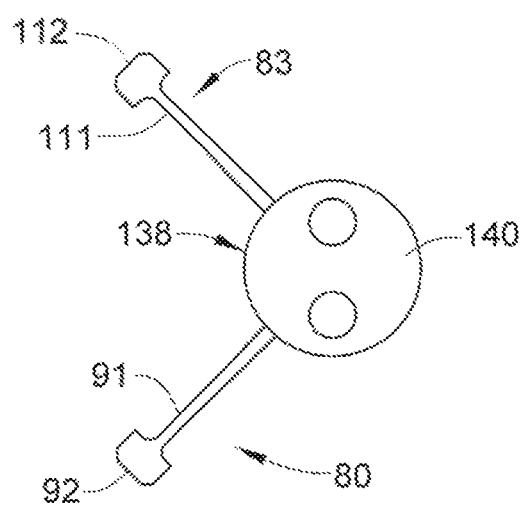
FIG. 5 is an axial plan view of the dynamic balancing system of FIG. 2 illustrating first and second balancing weights in a second configuration.

In still further accordance with an exemplary embodiment, dynamic balancing system 70 includes a control system 164 having a sensor 166 mounted to airframe 4. Sensor 166 detects vibrations from rotating components 38, shaft 6 and the like, and passes signals to a controller 174 having a central processing unit (CPU) 176 as shown in FIG. 3. Controller 174 receives signals from sensor 166 and operates first and second motors 144 and 146 to rotate and establish a desired vibration reduction position. For example, first and second balancing weight members 80 and 83 may be rotated and maintained substantially 180° out of phase as shown in FIG. 4. Alternatively, first and second balancing weight members 80 and 83 may be rotated and maintained about 45° out of phase such as shown in FIG. 5. The particular degree of phase is to reduce vibrations perceived at sensor 166 indicative of an out-of-balance condition.

At this point it should be understood that the exemplary embodiments describe a dynamic balancing system that is co-located with rotating members in a propeller system. The dynamic balancing system is controlled to correct for/counteract vibrations resulting from out-of-balance conditions in rotating components of the propeller system. The dynamic balancing system may correct for/counteract vibrations across a wide range of rotational speeds of the rotating components. It should be further understood that while described in terms of a propeller system, the dynamic balancing system may be used to counteract out-of-balance conditions in other rotating systems.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment or embodiments disclosed as the best mode contemplated for carrying out this invention, but that the invention will include all embodiments falling within the scope of the claims.

What is claimed is:

1. A propeller system comprising:
    a shaft including a driven end and a driving end;
    at least one propeller operatively coupled to the driven end, and a support member operatively connected to the at least one propeller; and
    a dynamic balancing system operatively connected to the support member, the dynamic balancing system comprising:
        a first balancing weight member rotatably mounted to the support member, the first balancing weight member being operatively connected to a first motor arranged on a motor support, the first balancing weight member being arranged between the at least one propeller and the first motor;
        a first ring gear extending through the motor support and operatively engaging the first balancing weight member;
        a second balancing weight member rotatably mounted to the support member, the second balancing weight member being operatively connected to a second motor arranged on the motor support, the second balancing weight member being arranged between the at least one propeller and the second motor;
        a second ring gear extending through the motor support and operatively engaging the second balancing weight member; and
        a controller operatively connected to the first and second motors, the controller being configured and disposed to signal each of the first and second motors to rotate and to establish a desired position of the first balancing weight member and the second balancing weight member relative to the at least one propeller to reduce system vibration.

2. The propeller system according to claim 1, further comprising: a sensor configured and disposed to sense vibrations at the shaft, the controller being configured and disposed to rotate and establish the desired position of the first balancing weight member and second balancing weight member relative to the at least one propeller to reduce vibrations perceived at the sensor.

3. The propeller system according to claim 1, wherein each of the first and second motors rotate with the at least one propeller.

4. The propeller system according to claim 1, wherein the first and second balancing weight members and first and second motors are co-located with the at least one propeller.

5. The propeller system according to claim 4, further comprising: a hub member extending across the support member and portions of the at least one propeller, the first and second motors and the first and second balancing weight members being housed within the hub member.

6. The propeller system according to claim 1, wherein the first balancing weight member includes a first base portion, a first arm portion extending from the first base portion, and a first balancing weight being coupled to the first arm portion.

7. The propeller system according to claim 6, wherein the first base portion is rotatably mounted to the support member.

8. The propeller system according to claim 6, wherein the first base portion is drivingly connected to the first motor through the first ring gear.

9. The propeller system according to claim 8, further comprising: a first driving member operatively coupled between the first motor and the first base portion, the first ring gear being carried by the first driving member.

10. The propeller system according to claim 6, wherein the second balancing weight member includes a second base portion, a second arm portion extending from the second base portion, and a second balancing weight being coupled to the second arm portion.

11. The propeller system according to claim 10, wherein the second base portion is rotatably mounted to the first base portion.

12. The propeller system according to claim 10, wherein the second base portion is drivingly connected to the second motor through the second ring gear.

13. The propeller system according to claim 12, further comprising: a second driving member operatively coupled between the second motor and the second base portion, the second ring gear being carried by the second driving member.

14. The propeller system according to claim 1, wherein each of the first and second motors and first and second balancing weight members are arranged axially outboard of the at least one propeller.

15. The propeller system according to claim 1, wherein the motor support being mounted to the support member, and the second motor being coupled to the motor support.

16. The propeller system according to claim 1, wherein each of the first and second motors are arranged axially outwardly of the first and second balancing weight members.

17. A method of balancing a propeller system including at least one propeller, the method comprising:
  imparting a driving force to a shaft operatively coupled to the at least one propeller;
  rotating a first balancing weight member with a first motor mounted to a motor support, the first balancing weight member being operatively coupled to a support member arranged axially outboard of, and connected with, the at least one propeller, the first balancing weight member being arranged between the first motor and the at least one propeller;
  driving the first balancing weight member with a first ring gear extending through the motor support;
  rotating a second balancing weight member with a second motor mounted to the motor support, he second balancing weight member being operatively coupled to the support member independently of the first balancing weight member, the second balancing weight member being arranged between the second motor and the at least one propeller;
  driving the second balancing weight member with a second ring gear extending through the motor support; and
  controlling a position of the first balancing weight member relative to the second balancing weight member.

18. The method of claim 17, further comprising:
  sensing vibration in the shaft; and
  controlling the position of the first balancing weight member relative to the second balancing weight member to reduce the sensed vibration.

19. The method of claim 17, further comprising: rotating the first and second motors with the at least one propeller.

20. The method of claim 17, further comprising: rotating the first and second balancing weight members within a hub member that covers, at least in part, a portion of the at least one propeller.

21. The method of claim 17, wherein operating the first and second motors includes activating the first and second motors arranged axially outwardly of the first and second balancing weight members.

* * * * *